United States Patent
Krieg

(10) Patent No.: US 11,980,516 B1
(45) Date of Patent: May 14, 2024

(54) DETECTING A LOW FLUID STATE IN A FLUID RESERVOIR

(71) Applicant: Fresh Health Inc., Mountain View, CA (US)

(72) Inventor: Kenneth Robert Krieg, Fremont, CA (US)

(73) Assignee: Fresh Health Inc., Mountain View, CA (US)

( * ) Notice: Subject to any disclaimer, the term of this patent is extended or adjusted under 35 U.S.C. 154(b) by 0 days.

(21) Appl. No.: 18/144,551

(22) Filed: May 8, 2023

Related U.S. Application Data

(60) Provisional application No. 63/460,568, filed on Apr. 19, 2023.

(51) Int. Cl.
*A61C 17/02* (2006.01)
*A61C 19/04* (2006.01)

(52) U.S. Cl.
CPC .......... *A61C 17/0202* (2013.01); *A61C 19/04* (2013.01)

(58) Field of Classification Search
CPC ............................ A61C 17/0202; A61C 19/04
See application file for complete search history.

(56) References Cited

U.S. PATENT DOCUMENTS

| | | | |
|---|---|---|---|
| 5,910,110 A * | 6/1999 | Bastable | A61M 1/72 600/398 |
| 10,299,821 B2 * | 5/2019 | Shelton, IV | A61B 17/320068 |
| 2006/0068360 A1 * | 3/2006 | Boulais | A61B 1/12 433/80 |
| 2008/0146996 A1 * | 6/2008 | Smisson | A61M 1/0281 604/113 |
| 2009/0143734 A1 * | 6/2009 | Humayun | A61M 1/77 606/1 |
| 2010/0174415 A1 * | 7/2010 | Humayun | A61B 50/33 137/565.17 |
| 2011/0087197 A1 * | 4/2011 | Mombrinie | A61M 3/022 604/540 |
| 2015/0105701 A1 * | 4/2015 | Mayer | A61N 7/02 601/3 |
| 2019/0001057 A1 * | 1/2019 | Tsoukalis | G06K 7/10366 |
| 2022/0104820 A1 * | 4/2022 | Shelton, IV | A61B 17/07207 |

* cited by examiner

*Primary Examiner* — Nicholas D Lucchesi
(74) *Attorney, Agent, or Firm* — Van Pelt, Yi & James LLP

(57) ABSTRACT

An oral health care device is activated. The oral health care device includes a fluid reservoir and a pump to provide fluid included in the fluid reservoir to a plurality of fluid nozzles. A sensed value is used to determine whether the fluid is being provided to the plurality of fluid nozzles via the pump. A motor associated with the pump is stopped based on whether the fluid is being provided to the plurality of fluid nozzles via the pump.

22 Claims, 5 Drawing Sheets

DETECTING A LOW FLUID STATE IN A FLUID RESERVOIR

CROSS REFERENCE TO OTHER APPLICATIONS

This application claims priority to U.S. Provisional Patent Application No. 63/460,568 entitled DETECTING A LOW FLUID STATE IN A FLUID RESERVOIR filed Apr. 19, 2023 which is incorporated herein by reference for all purposes.

BACKGROUND OF THE INVENTION

An oral health care device may include a fluid reservoir, a pump, and an oral insert. The oral insert includes a plurality of manifolds and a plurality of fluid nozzles. The oral insert is coupled to the pump. The fluid reservoir includes an opening at a bottom surface of the fluid reservoir. Fluid is introduced into the fluid reservoir. A user may insert the oral insert into their mouth and subsequently turn on the oral health care device. The plurality of fluid nozzles are located at locations customized to the oral anatomy of the user. When the oral health care device is turned on, the pump causes fluid to exit the fluid reservoir and to be directed towards the oral anatomy of the user via the plurality of manifolds and the plurality of fluid nozzles.

BRIEF DESCRIPTION OF THE DRAWINGS

Various embodiments of the invention are disclosed in the following detailed description and the accompanying drawings.

DETAILED DESCRIPTION

Figure 1A:
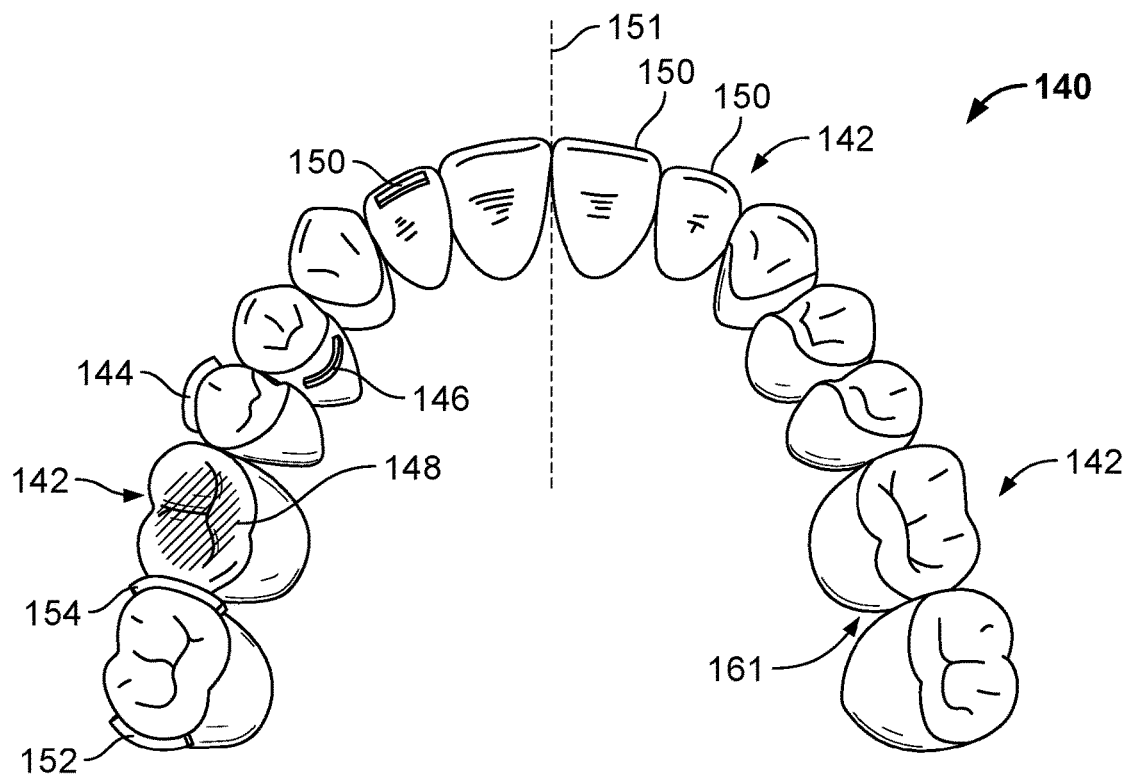
FIG. 1A depicts a top view of a set of teeth of the mandible or lower jaw.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The efficacy of an oral health care device may depend on the amount of time with which a user is using the oral health care device. The oral health care device may be configured to deliver fluid for a particular amount of time (e.g., 8 seconds) from a fluid reservoir associated with the oral health care device to an oral insert associated with the oral health care device. The efficacy of the oral health care device decreases when the oral health care device is unable to deliver the fluid for the particular amount of time. The fluid reservoir may include a fill line that indicates an amount of fluid with which a user is to fill the fluid reservoir. The efficacy of the oral health care device may remain at the expected efficacy in the event the user fills the fluid reservoir at or above the fill line. The efficacy of the oral health care device may decrease in the event the user fills the fluid reservoir with an amount of fluid that is below the fill line.

The oral insert includes a plurality of manifolds, each manifold includes a plurality of fluid nozzles. The oral insert associated with the oral health care device may be configured to receive fluid from the fluid reservoir via a handle and output the fluid towards the oral anatomy of a user via the plurality of manifolds and fluid nozzles. The handle includes a manifold switch configured to output fluid sequentially to each manifold at a predetermined rate. Air may enter the manifold switch during operation of the oral health care device when a user fills the fluid reservoir with an amount of fluid that is below the fill line. The manifold switch may continue to output air until the oral health care device is turned off. Repeatedly operating the oral health care device in such a manner may cause damage to the manifold switch.

A technique to improve the efficacy of an oral care treatment and to prevent damage to the oral health care device is disclosed. The technique includes activating the oral health care device. In some embodiments, the handle includes one or more buttons to activate the oral health care device. In some embodiments, a base station on which the fluid reservoir is located includes one or more buttons to activate the oral health care device.

A fluid level associated with the fluid reservoir is monitored. In some embodiments, the fluid level is monitored by determining a current associated with a pump motor of the oral health care device. For example, the current associated with the oral health care device may be determined using a shunt resistor, low-side current sensing, a Hall Effect current sensor, an inducive current sensor, a magneto resistive current sensor, a current transformer, a flux gate current sensor, or any other type of device to determine the current. In some embodiments, the fluid level is monitored using an ultrasonic transmitter and receiver. In some embodiments, the fluid level is monitored by determining the impedance of the fluid in the fluid reservoir. In some embodiments, the fluid level is monitored by an optical transmitter and receiver.

In some embodiments, the determined current associated with the pump motor is compared to an expected current value. In other embodiments, the determined ultrasonic value is compared to an expected ultrasonic value (e.g., time of flight value). In other embodiments, the determined impedance of the fluid is compared to an expected impedance value. In some embodiments, an optical value (e.g., photodiode output) is compared to an expected optical value. The expected value ±a threshold tolerance is outputted when the manifold switch is outputting fluid to the oral insert. A low fluid value (e.g., expected value less a threshold) is outputted when the manifold switch is outputting air to the oral insert.

In response to determining that the low fluid value is being outputted (i.e., the fluid reservoir is in a low fluid state), a velocity of the pump motor is reduced according to a velocity profile. In some embodiments, the velocity profile is a straight line. In some embodiments, the velocity profile is an exponential curve with a decreasing slope. The velocity of the pump motor is reduced according to a velocity profile to prevent a user of the oral health care device from experiencing a sudden movement (e.g., a jerk). The oral health care device is subsequently turned off after the velocity of the pump motor has stopped. This may prevent wear on the manifold switch that occurs when the manifold switch outputs air instead of a fluid.

In some embodiments, a user of the oral health care device is notified that the user did not provide enough water in the fluid reservoir. For example, the handle and/or base station may include one or more lights that indicate the fluid reservoir was filled to an insufficient amount. In some embodiments, the handle and/or base station includes a display that indicates the fluid reservoir was filled to an insufficient amount. The user may use the feedback to properly fill the fluid reservoir in a next cleaning session to achieve the expected efficacy of the oral health care device.

Oral Anatomy

Figure 1B:
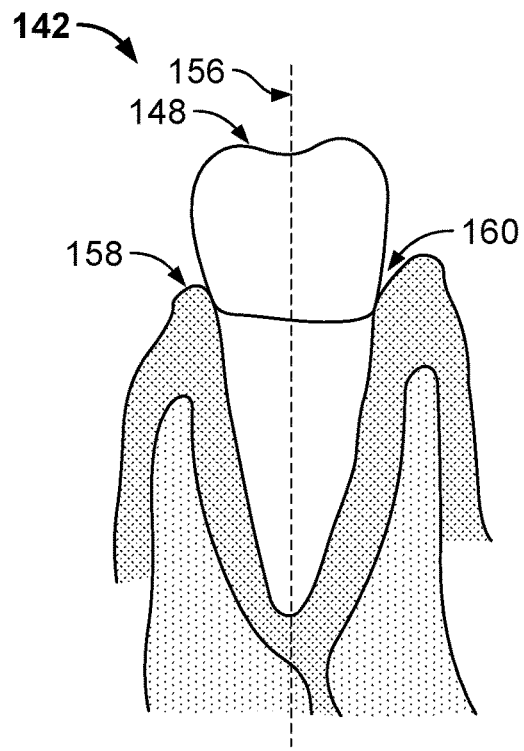
FIG. 1B depicts a side view of a single tooth.
Figure 1C:
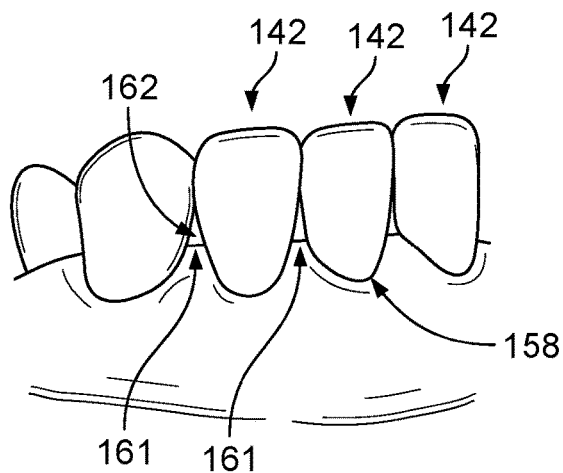
FIG. 1C depicts a side view of a plurality of teeth.

FIGS. 1A-1C are schematic depictions of oral anatomy and dental structures, illustrating the regions of the oral cavity described herein. FIG. 1A depicts a top view of a set of teeth 140 of the mandible or lower jaw (though similar terminology may be used to refer to the teeth and structures of the maxilla or upper jaw). Each tooth 142 may have a facial surface 144 which is the region of the tooth that contacts the cheeks or lips and a lingual surface 146 which is the region of the tooth that contacts (or is nearest to) the tongue. Facial surfaces may be, for example, the buccal surfaces of the posterior teeth and the labial surfaces of the anterior teeth. Lingual surfaces may also be referred to as the palatal surfaces for maxillary teeth. Posterior teeth may have an occlusal surface 148 and the anterior teeth may have an incisal edge or surface 150. The occlusal (or incisal) surface is the region of the tooth that aids in chewing and/or faces across from the occlusal (or incisal) surface of the opposing tooth. The surface of a tooth facing away from the arch midline may be referred to as the distal surface 152 while the surface of a tooth facing toward the arch midline 151 may be referred to as the mesial surface 154.

FIG. 1B depicts a side view of a single tooth 142, which may have a longitudinal axis 156 that extends along the longest dimension of the tooth 142 and/or is substantially perpendicular to the occlusal surface 148 or incisal edge 150 of the tooth. The edge or boundary of the gums (e.g., gingiva, gingival tissue) along the surfaces of the teeth or closest to the occlusal surfaces or incisal edge of the teeth may be referred to as the gingival margin 158. The gingival margin 158 may have one or more curves along the bottom of each tooth, and the radius of curvature and length of the gingival margin for each tooth may vary. A space or region 160 between the gingiva and the surfaces of the tooth may be referred to as a gingival sulcus 160. Interdental gingiva 161 may be the gum tissue located between two adjacent teeth.

FIG. 1C depicts a side view of a plurality of teeth 142. The space or gap between each tooth 142 may be referred to as the interproximal space or gap 162, and may be defined by the mesial surface of one tooth and the distal surface of the adjacent tooth, or the mesial surfaces of two teeth, in the case of central incisor teeth. The left side of a user's oral cavity may be the region of the oral cavity that is to the left of the interproximal space between the two central incisors (e.g., to the left of the arch midline), and the right side of a user's oral cavity may be the region of the oral cavity that is to the right of the interproximal space between the two central incisors (e.g., to the right of the arch midline).

Figure 1D:
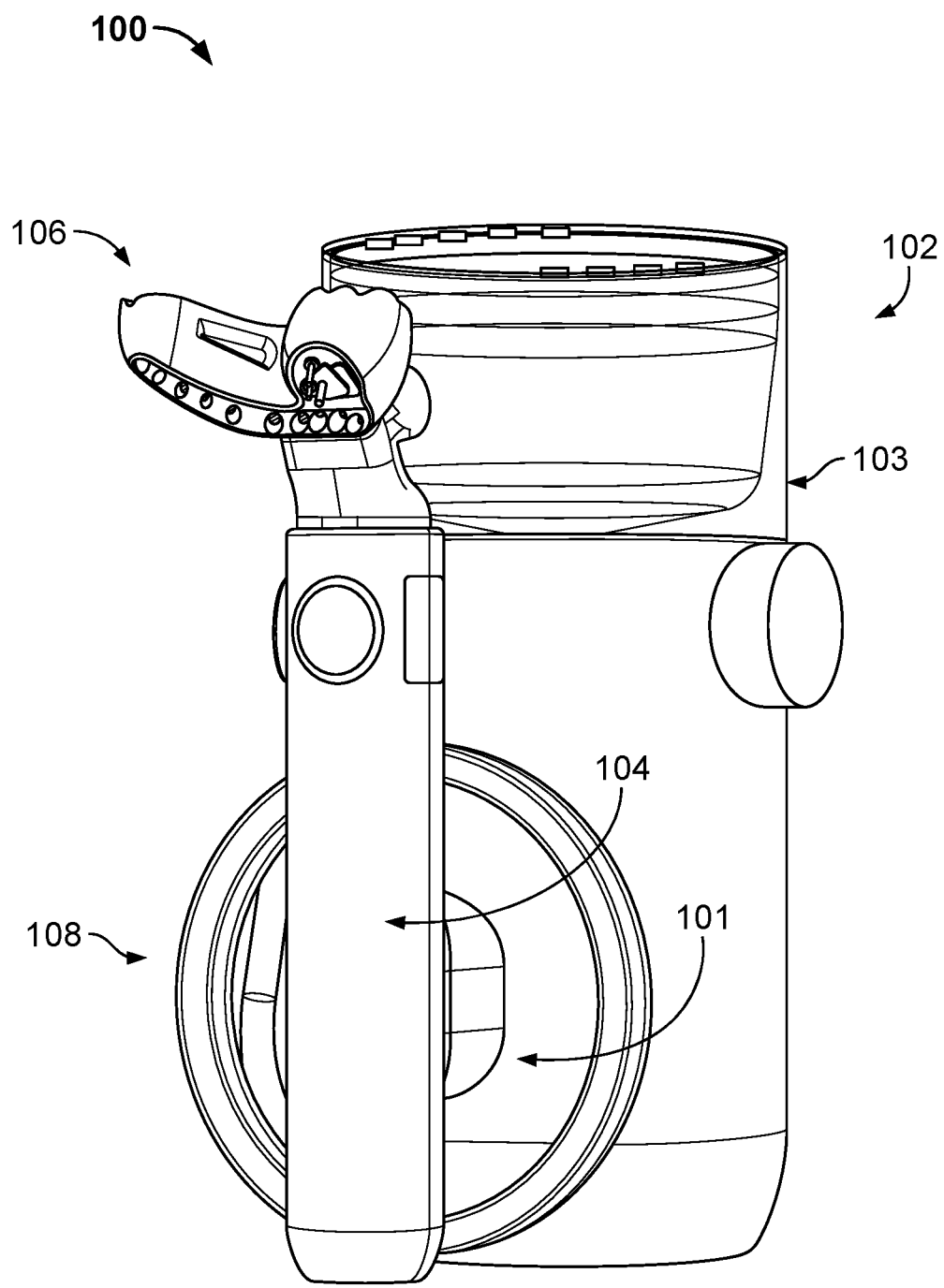
FIG. 1D is a diagram illustrating an oral health care device in accordance with some embodiments.

FIG. 1D is a diagram illustrating an oral health care device in accordance with some embodiments. In the example shown, oral health care device 100 includes base station 102 that is coupled to fluid reservoir 103, handle 104, and a customized oral insert 106 coupled to handle 104. Oral insert 106 may comprise an upper portion and a lower portion that are sized and shaped according to a user's oral cavity. A plurality of fluid nozzles of oral insert 106 are directed toward interproximal spaces between the user's teeth. Oral insert 106 further comprises an effluence conduit located between the upper portion and the lower portion and configured to channel fluid circulating within the user's mouth to an anterior or facial region of the user's oral cavity. One or more fluid conduits 108 may connect fluid reservoir 103 to handle 104, which has a fluid regulator that distributes fluid to oral insert 106. System 100 may optionally comprise charging station 101 for handle 104.

Handle 104 may comprise one or more control buttons (e.g., a start/stop button, a fluid flow adjustment dial). In some embodiments, the one or more control buttons may be located on base station 102. In some embodiments, charging station 101 and handle 104 are optional and oral insert 106 is coupled directly to fluid reservoir 103 via the one or more conduits 108. In some embodiments, handle 104 includes a motor associated with manifold switch 234.

Oral insert 106 is customized to a user. That is, oral insert 106 includes a plurality of fluid nozzles that are arranged in accordance with the unique geometry of the user's oral cavity, gingival geometry, dental structures, and any oral and/or dental devices or implants. Examples of oral and/or dental devices may include, but are not limited to, permanent and removable dental restorations/prosthetics, orthodontic appliances, crows, bridges, implants, braces, retainers, dentures, etc. Each of the fluid nozzles is positioned to target a specific dental feature. Inside of oral insert 106, the fluid nozzles may be connected to one or more internal manifolds. The inlets of these manifolds may extend from the back of oral insert 106 in the form of a standardized connector, to which handle 104 and/or conduit 108 may be connected.

Figure 2:
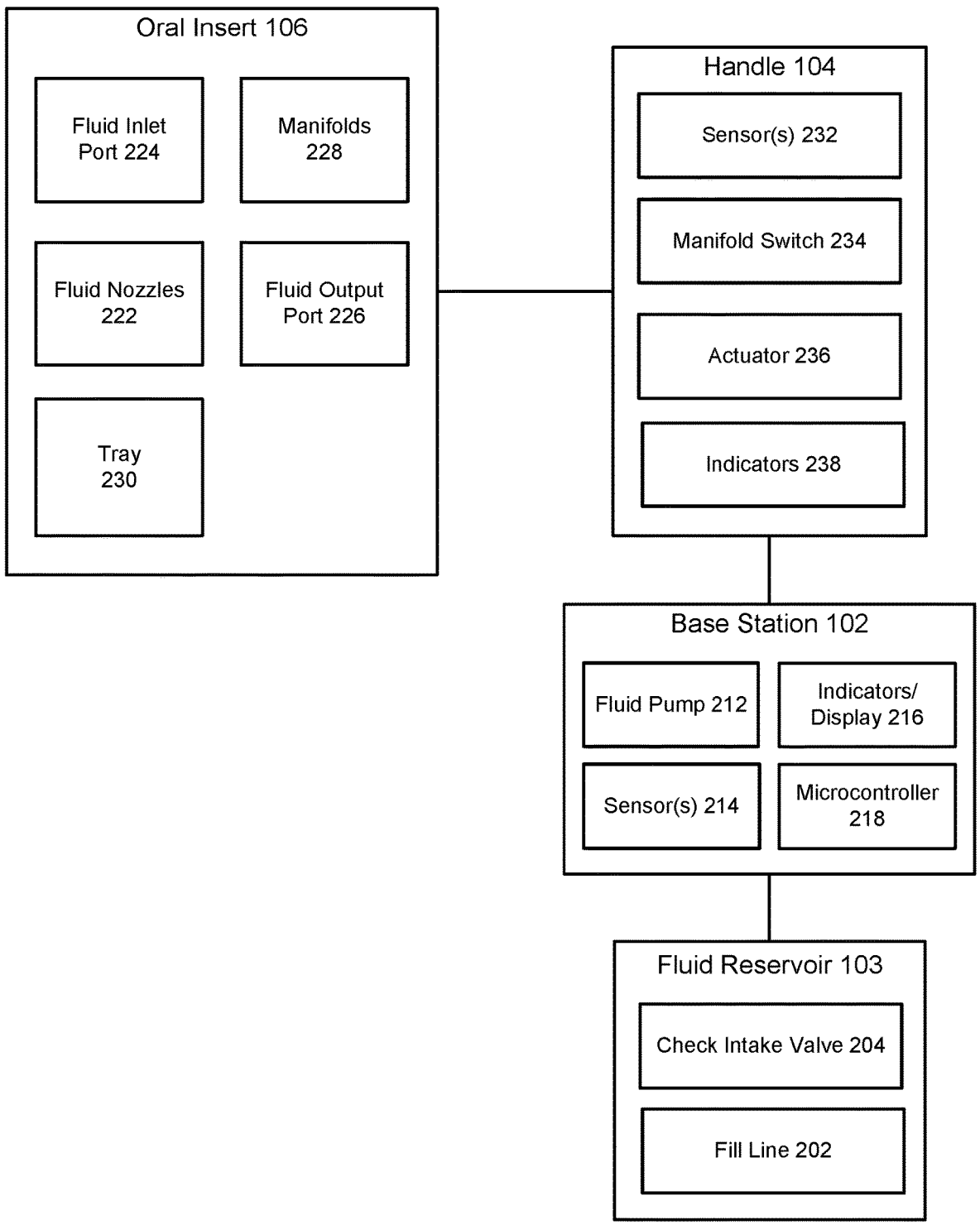
FIG. 2 is a block diagram illustrating an oral health care device in accordance with some embodiments.

FIG. 2 is a block diagram illustrating an oral health care device in accordance with some embodiments. In the example shown, oral health care device 200 includes fluid reservoir 103 that is coupled to base station 102, which is coupled to handle 104. Handle 104 is coupled to oral insert 106.

Oral insert 106 may be releasably engaged with handle 104 and fluid reservoir 103. A user may use handle 104 to manipulate and position oral insert 106 within the oral anatomy of the user. Oral insert 106 may be configured to be in fluid communication with fluid reservoir 103. Oral insert 106 may output a predetermined volume of fluid received from fluid reservoir 103. The rate at which the fluid is outputted from fluid reservoir 103 to oral insert 106 depends on a power rating associated with fluid pump 212. Fluid pump 212 may have a power rating between 180 W to 200 W and may cause the fluid to have a flow rate between 70 ml/s and 100 ml/s. Such a flow rate may be necessary to ensure an effective oral treatment within the particular period of time (e.g., 8 seconds).

The fluid structures defined by the oral insert 106 may comprise a fluid inlet port 224, a set of manifolds 228, a set of fluid nozzles 222, and a fluid outlet port (e.g., effluence port) 226. The oral insert 106 may define a tray 230 configured to retain teeth (e.g., upper teeth, lower teeth). The tray 230 may be configured such that at least a portion of the tray 230 corresponds to a shape of the user's teeth.

Oral insert 106 is configured to receive fluid from fluid reservoir 103 at fluid inlet port 224. Fluid inlet port 224 may be configured to be in fluid communication with the set of manifolds 228 and the set of nozzles 222. In one embodiment, oral insert 106 includes a set of 8 manifolds where each manifold includes 8 nozzles. Fluid output from the set of nozzles 222 may be directed at the user's oral anatomy, for example, through the interproximal spaces between the teeth. A nozzle may be positioned at any location on a manifold. However, the nozzle position is specific to the oral structure of a user. After the fluid passes through and/or irrigates the user's oral anatomy, the fluid may then be guided to the fluid outlet port 226 to exit the user's oral cavity. In some variations, fluid may flow sequentially into fluid inlet 224 and through the set of manifolds 228 and their respective nozzles 222. The set of nozzles 222 may be configured to output fluid toward oral anatomy. Fluid outlet port 226 may then receive the fluid (e.g., effluence) and channel it away from the oral anatomy.

In some embodiments, oral insert 106 is configured to receive fluid from handle 104 and/or fluid reservoir 103. In some embodiments, handle 104 is comprised of a manifold switch 234 and an actuator 236. Manifold switch 234 is configured to select and route fluid into one or more of the manifolds 228. For example, manifold switch 234 may be configured to output fluid sequentially to each manifold at a predetermined rate. This may allow control of fluid flow rates to increase user comfort by preventing an excess volume of pressurized fluid from entering and exiting a user's mouth. Manifold switch 234 may be associated with a motor. Handle 104 may comprise actuator 236 configured to operate one or more of the fluid pump 212 and manifold switch 234. Handle 104 may include one or more sensors 232. The one or more sensors 232 may measure a current associated with manifold switch 234. For example, the current associated with the oral health care device may be determined using a shunt resistor, low-side current sensing, a Hall Effect current sensor, an inducive current sensor, a magneto resistive current sensor, a current transformer, a flux gate current sensor, or any other type of device to determine the current. Manifold switch 234 may be associated with a first current when manifold switch 234 is outputting fluid to oral insert 106 and associated with a second current when manifold switch 234 is outputting air to oral insert 106. The first current may differ from the second current by a threshold (e.g., 30-35% decrease in current). In some embodiments, handle 104 includes one or more indicators 238 (e.g., lights) to indicate that manifold switch 234 is outputting air. In some embodiments, the one or more indicators 238 indicate that oral health care device 200 is turning off as a result of manifold switch 234 outputting air.

Base station 102 includes fluid pump 212. Fluid inlet port 224 is coupled to fluid pump 212. Fluid pump 212 is configured to output pressurized fluid from fluid reservoir 103 to oral insert 106. Fluid pump 212 is configured to output pressurized fluid such that a flow rate of the pressurized fluid at each of the fluid nozzles 222 is the same flow rate within a predetermined tolerance. To provide an oral care treatment having a particular efficacy, fluid pump 212 is configured to provide a particular flow rate of fluid having a particular amount of pressure.

Base station 102 may include one or more sensors 214. The one or more sensors 214 may measure a current associated with a motor of fluid pump 212. For example, the current associated with the motor of fluid pump 212 may be determined using a shunt resistor, low-side current sensing, a Hall Effect current sensor, an inducive current sensor, a magneto resistive current sensor, a current transformer, a flux gate current sensor, or any other type of device to determine the current. The motor of fluid pump 212 may be associated with a first current when fluid pump 212 is outputting fluid to oral insert 106 and associated with a second current when fluid pump 212 is outputting air to oral insert 106. The first current may differ from the second current by a threshold (e.g., 30-35% decrease in current). The first current differs from the second current because the amount of torque needed to pump air is lower than the amount of torque needed to pump a fluid. A measured value is provided to microcontroller 218. In some embodiments, base station 102 includes a display or one or more indicators 216 (e.g., lights). Microcontroller 218 may provide a control signal to indicators/display 216 to indicate that manifold switch 234 is outputting air. In some embodiments, the display or one or more indicators 216 indicate that oral health care device 200 is turning off. In response to receiving a measured value associated with the second current, microcontroller 218 may send a control signal to fluid pump 212 to reduce a velocity of a motor of fluid pump 212 according to a velocity profile. In some embodiments, the velocity profile is a straight line. In some embodiments, the velocity profile is an exponential curve with a decreasing slope. The velocity of the pump motor is reduced according to a velocity profile to prevent a user of oral health care device 200 from experiencing a sudden movement (e.g., a jerk).

Fluid reservoir 103 is configured to hold a predetermined volume of fluid. For example, fluid reservoir 103 may be configured to hold enough fluid for at least one cleaning cycle. Fluid reservoir 103 may include fill line 202 that indicates an amount of fluid with which a user is to fill the fluid reservoir. The efficacy of the oral health care device 200 may be the expected efficacy in the event the user fills fluid reservoir 103 at or above fill line 202. The efficacy of the oral health care device 200 may decrease in the event the user fills fluid reservoir 103 with an amount of fluid that is below fill line 202.

In some embodiments, fluid reservoir 103 has a cylindrical shape. In some embodiments, fluid reservoir 103 has a different shape (e.g., rectangular, pentagon, hexagon, heptagon, octagon, etc.).

Fluid reservoir 103 includes a check intake valve 204. In some embodiments, check intake valve 204 is located off-centered from a bottom surface of fluid reservoir 103. In some embodiments, check intake valve 204 is located at a center of the bottom surface of fluid reservoir 103. Fluid pump 212 pumps fluid from fluid reservoir 103 to handle 104 via check intake valve 204.

Figure 3:
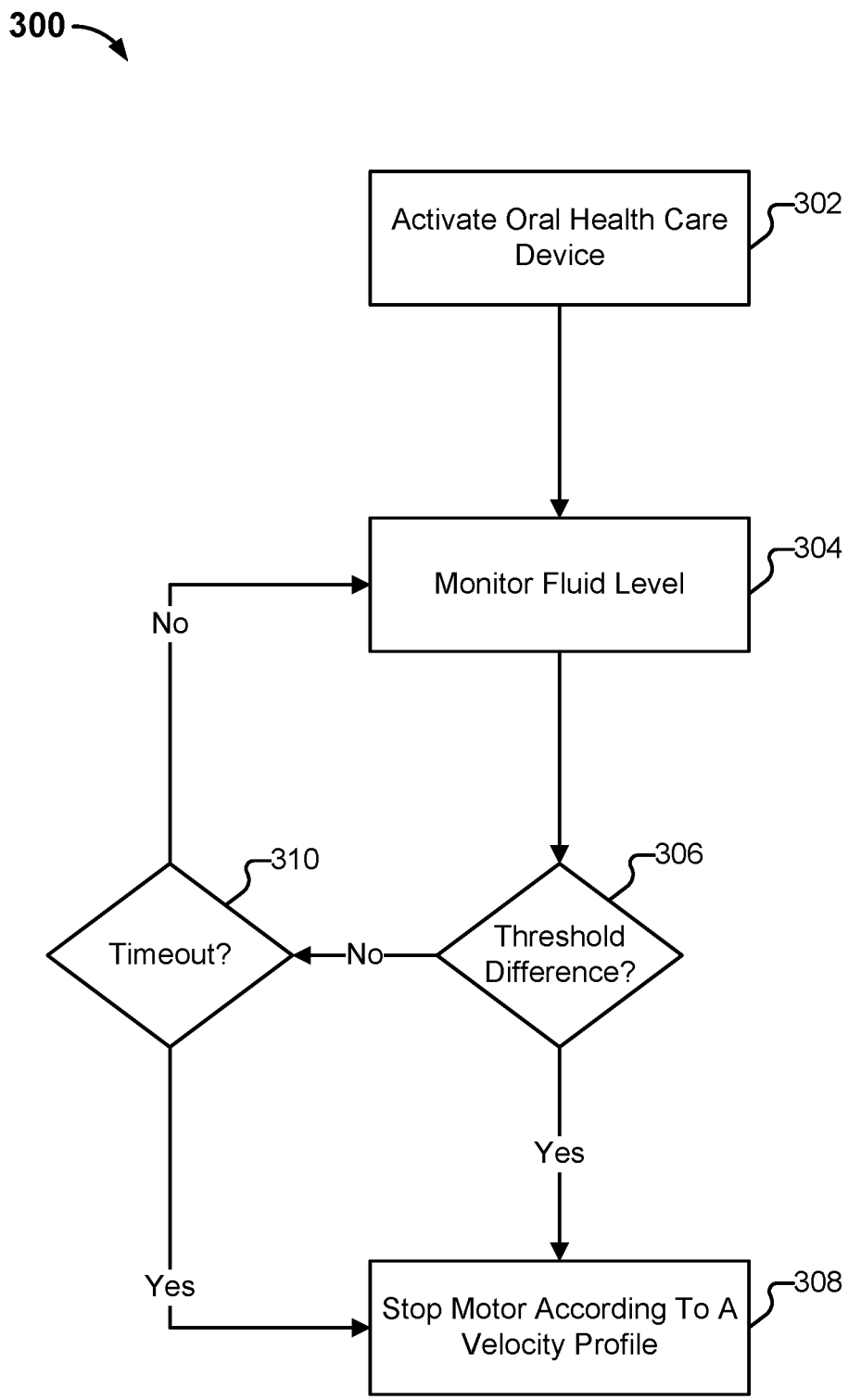
FIG. 3 is a flow diagram illustrating a process for operating an oral health care device in accordance with some embodiments.

FIG. 3 is a flow diagram illustrating a process for operating an oral health care device in accordance with some embodiments. In the example shown, process 300 may be implemented by an oral health care device, such as oral health care devices 100, 200.

At 302, an oral health care device is activated. The oral health care device includes a fluid reservoir. A user associated with the oral health care device introduces a fluid (e.g., water, cleaning solution) into the fluid reservoir. The oral health care device includes an actuator to turn on the oral health care device. In some embodiments, the actuator is located on a handle of the oral health care device. In some embodiments, the actuator is located on a base station of the oral health care device. The oral health care device is activated in response to the actuator being pressed.

At 304, a fluid level associated with the fluid reservoir is monitored. A bottom surface of the fluid reservoir includes a check intake valve. A pump is coupled to the check intake valve and causes fluid to be provided from the fluid reservoir to an oral insert associated with the oral health care device. A motor associated with the pump outputs a current value that indicates whether a manifold switch is providing fluid or air to the oral insert.

At 306, it is determined whether a measured value differs from an expected value by a threshold. The measured value indicates whether a manifold switch is providing fluid or air to the oral insert. In some embodiments, the threshold is a threshold amount. In some embodiments, the threshold is a threshold percentage.

In some embodiments, a measured current value is compared to an expected current value. The measured current value may be determined using a shunt resistor, low-side current sensing, a Hall Effect current sensor, an inductive current sensor, a magneto resistive current sensor, a current transformer, a flux gate current sensor, or any other type of device to determine the current.

In some embodiments, a measured impedance value is compared to an expected impedance value. The measured impedance value may be determined using an impedance sensor. In some embodiments, a measured time of flight value is compared to an expected time of flight value. The measured time of flight value may be determined using an ultrasonic transmitter and receiver. In some embodiments, a measured optical value is compared to an expected optical value. The measured optical value may be determined using an optical transmitter and receiver.

In response to a determination that the measured value differs from the expected value by the threshold (i.e., the fluid reservoir is in a low fluid state), process 300 proceeds to 308. In response to a determination that the measured value does not differ from the expected value by the threshold, process 300 proceeds to 310.

At 308, a motor of a pump is stopped according to a velocity profile. In some embodiments, the velocity profile is a straight line. In some embodiments, the velocity profile is an exponential curve with a decreasing slope. The velocity of the pump motor is reduced according to a velocity profile to prevent a user of oral health care device 200 from experiencing a sudden movement (e.g., a jerk).

At 310, it is determined whether a timeout condition has been reached. The oral health care device is configured to operate for a particular amount of time (e.g., 8 seconds). In response to a determination that the timeout condition has been reached (e.g., the oral care device has completed a cleaning cycle), process 300 proceeds to 308. In response to a determination that the timeout condition has not been reached, process 300 returns to step 304.

Figure 4:
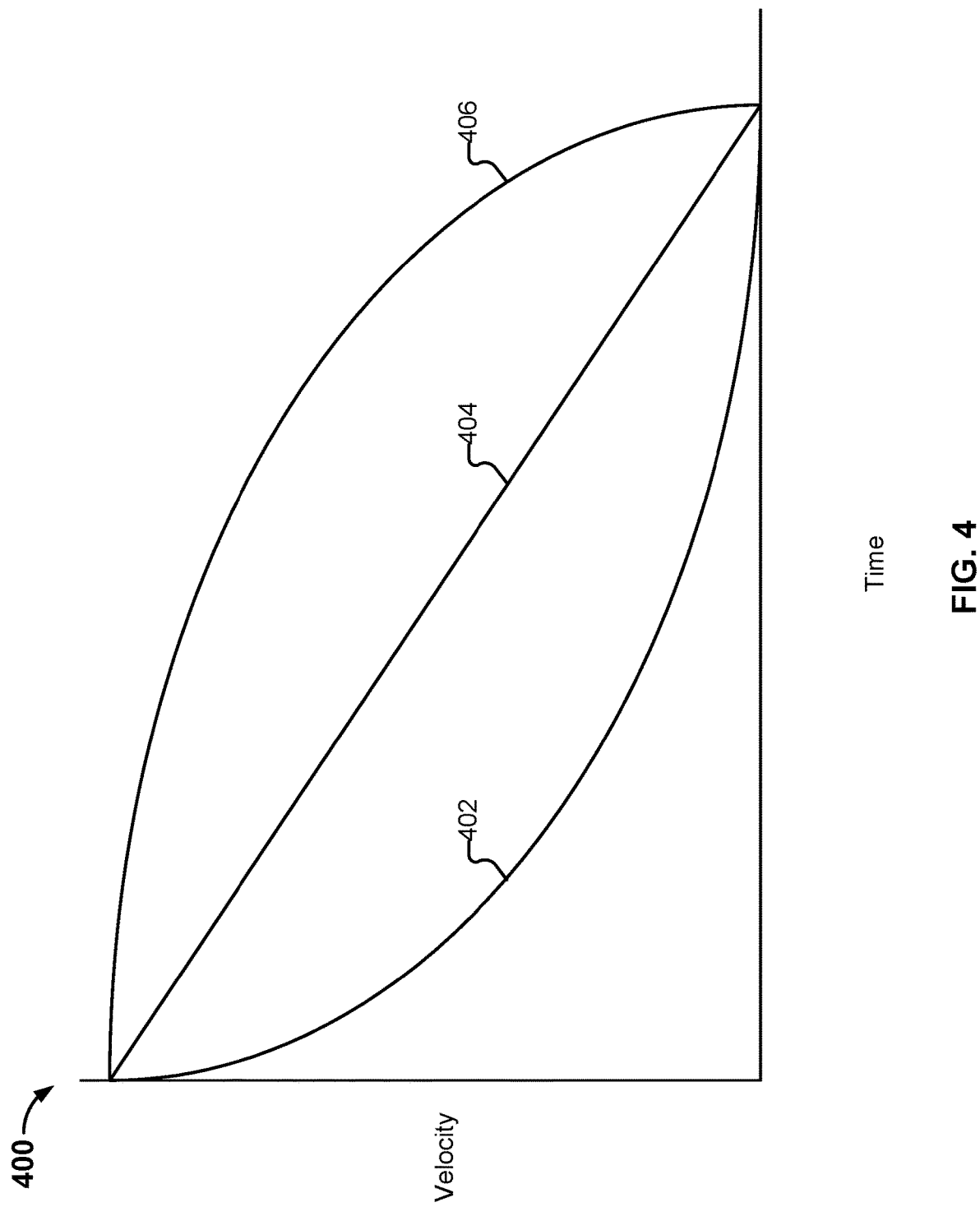
FIG. 4 is a diagram illustrating velocity profiles in accordance with some embodiments.

FIG. 4 is a diagram illustrating velocity profiles in accordance with some embodiments. In the example shown, graph 400 includes a first velocity profile 402, a second velocity profile 404, and a third velocity profile 406. The velocity profiles 402, 404, 406 are lines that indicate a velocity decreases as time increases. Velocity profiles 402, 406 are exponential lines having a negative slope. Velocity profile 404 is a straight line having a negative slope. A velocity associated with a pump motor may be decreased according to the first velocity profile 402, the second velocity profile 404, or the third velocity profile 406 when it is determined that a manifold switch included in a handle of the oral health care device is outputting air. The velocity of the pump motor is reduced according to one of the velocity profiles 402, 404, 406 to prevent a user of oral health care device 200 from experiencing a sudden movement (e.g., a jerk).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An oral health care device, comprising:
   a fluid reservoir;
   a pump;
   a plurality of fluid nozzles configured to receive fluid from the pump and deliver the fluid to provide a cleaning effect; and
   a sensor configured to sense whether the fluid is being provided to the plurality of fluid nozzles via the pump, wherein the sensor is a current sensor configured to output a first current value when the fluid is being provided to the plurality of fluid nozzles and a second current value when the fluid is not being provided to the plurality of fluid nozzles, wherein a motor associated with the pump is stopped according to a velocity profile in response to a determination that the current sensor is outputting the second current value.

2. The oral health care device of claim 1, wherein the first current value differs from the second current value by a threshold.

3. The oral health care device of claim 2, wherein the threshold is a threshold amount or a threshold percentage.

4. The oral health care device of claim 1, wherein the velocity profile is a straight line having a negative slope.

5. The oral health care device of claim 1, wherein the velocity profile is an exponential line having a negative slope.

6. The oral health care device of claim 1, wherein the pump is configured to provide the fluid from the fluid reservoir to the plurality of fluid nozzles for a particular amount of time.

7. An oral health care device, comprising:
   a fluid reservoir;
   a pump;
   a plurality of fluid nozzles configured to receive fluid from the pump and deliver the fluid to provide a cleaning effect; and
   a sensor configured to sense whether the fluid is being provided to the plurality of fluid nozzles via the pump, wherein the sensor is an impedance sensor configured to output a first value when the fluid is being provided to the plurality of fluid nozzles and a second value when the fluid is not being provided to the plurality of fluid nozzles, wherein a motor associated with the pump is stopped according to a velocity profile in response to a determination that the impedance sensor is outputting the second value.

8. The oral health care device of claim 7, wherein the velocity profile is a straight line having a negative slope.

9. The oral health care device of claim 7, wherein the velocity profile is an exponential line having a negative slope.

10. An oral health care device, comprising:
a fluid reservoir;
a pump;
a plurality of fluid nozzles configured to receive fluid from the pump and deliver the fluid to provide a cleaning effect; and
a sensor configured to sense whether the fluid is being provided to the plurality of fluid nozzles via the pump, wherein the sensor is an ultrasonic sensor configured to output a first value when the fluid is being provided to the plurality of fluid nozzles and a second value when the fluid is not being provided to the plurality of fluid nozzles, wherein a motor associated with the pump is stopped according to a velocity profile in response to a determination that the ultrasonic sensor is outputting the second value.

11. The oral health care device of claim 10, wherein the velocity profile is a straight line having a negative slope.

12. The oral health care device of claim 10, wherein the velocity profile is an exponential line having a negative slope.

13. An oral health care device, comprising:
a fluid reservoir;
a pump;
a plurality of fluid nozzles configured to receive fluid from the pump and deliver the fluid to provide a cleaning effect; and
a sensor configured to sense whether the fluid is being provided to the plurality of fluid nozzles via the pump, wherein the sensor is an optical sensor configured to output a first value when the fluid is being provided to the plurality of fluid nozzles and a second value when the fluid is not being provided to the plurality of fluid nozzles, wherein a motor associated with the pump is stopped according to a velocity profile in response to a determination that the optical sensor is outputting the second value.

14. The oral health care device of claim 13, wherein the velocity profile is a straight line having a negative slope.

15. The oral health care device of claim 13, wherein the velocity profile is an exponential line having a negative slope.

16. A method, comprising:
activating an oral health care device that includes a fluid reservoir and a pump to provide fluid included in the fluid reservoir to a plurality of fluid nozzles;
using a sensed value to determine whether the fluid is being provided to the plurality of fluid nozzles via the pump; and
stopping a motor associated with the pump based on whether the fluid is being provided to the plurality of fluid nozzles via the pump, wherein the motor associated with the pump is stopped according to a velocity profile.

17. The method of claim 16, wherein the sensed value is outputted by a current sensor.

18. The method of claim 17, wherein the current sensor outputs a first current value when the fluid is being provided to the plurality of fluid nozzles and a second current value when the fluid is not being provided to the plurality of fluid nozzles.

19. The method of claim 18, wherein the first current value differs from the second current value by a threshold.

20. The method of claim 18, wherein the motor associated with the pump is stopped in response to a determination that the current sensor is outputting the second current value.

21. The method of claim 16, wherein the velocity profile is a straight line having a negative slope.

22. The method of claim 16, wherein the velocity profile is an exponential line having a negative slope.

\* \* \* \* \*